United States Patent
Fukushima

(10) Patent No.: US 9,015,498 B2
(45) Date of Patent: Apr. 21, 2015

(54) INFORMATION PROCESSING APPARATUS AND CONTROL METHOD THEREOF

(75) Inventor: Kenta Fukushima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 132 days.

(21) Appl. No.: 13/695,771

(22) PCT Filed: Apr. 27, 2011

(86) PCT No.: PCT/JP2011/060680
§ 371 (c)(1),
(2), (4) Date: Nov. 1, 2012

(87) PCT Pub. No.: WO2011/142326
PCT Pub. Date: Nov. 17, 2011

(65) Prior Publication Data
US 2013/0046996 A1   Feb. 21, 2013

(30) Foreign Application Priority Data

May 11, 2010 (JP) ................. 2010-109584
Feb. 8, 2011 (JP) ................. 2011-025339
Apr. 20, 2011 (JP) ................. 2011-094379

(51) Int. Cl.
G06F 11/30 (2006.01)
H04N 1/21 (2006.01)
H04N 1/327 (2006.01)
H04N 1/44 (2006.01)
G06F 12/14 (2006.01)
(Continued)

(52) U.S. Cl.
CPC .......... *H04N 1/2179* (2013.01); *H04N 1/00204* (2013.01); *H04N 1/00244* (2013.01); *H04N 1/32771* (2013.01); *H04N 1/4426* (2013.01); *H04N 1/444* (2013.01); *H04N 1/4486* (2013.01); *H04N 2201/001* (2013.01); *H04N 2201/0039* (2013.01); *H04N 2201/0094* (2013.01)

(58) Field of Classification Search
CPC ................. H04N 2201/0094; G06F 21/608; G06F 3/1238; G06F 3/1288
See application file for complete search history.

(56) References Cited

U.S. PATENT DOCUMENTS 7,508,939 B2   3/2009 Hashimoto
8,010,785 B2 * 8/2011 Kawai et al. .................. 713/156
(Continued)

FOREIGN PATENT DOCUMENTS

JP   2005-151459   6/2005
JP   2008-46918    2/2008
(Continued)

*Primary Examiner* — Dede Zecher
*Assistant Examiner* — Trang Doan
(74) *Attorney, Agent, or Firm* — Fitzpatrick, Cella, Harper & Scinto

(57) ABSTRACT

An information processing apparatus capable of communicating with a document management service and a terminal device, the apparatus comprises: acceptance means for accepting, from the terminal device, an instruction about a document stored in the document management service; and instruction means for, when the document file has not been encrypted according to a public key cryptosystem, transmitting an instruction to the document management service to execute processing corresponding to the instruction accepted by the acceptance means, and when the document file has been encrypted according to the public key cryptosystem, transmitting an instruction to the document management service to directly transmit the encrypted document to the terminal device.

6 Claims, 13 Drawing Sheets

(51) Int. Cl.
  *G06F 17/30* (2006.01)
  *H04N 1/00* (2006.01)

(56) References Cited

U.S. PATENT DOCUMENTS

| | | | |
|---|---|---|---|
| 8,339,639 B2* | 12/2012 | St. Jacques et al. | 358/1.15 |
| 2006/0136726 A1* | 6/2006 | Ragnet et al. | 713/171 |
| 2007/0101420 A1* | 5/2007 | Masui | 726/10 |
| 2007/0133033 A1* | 6/2007 | Mizutani et al. | 358/1.14 |
| 2008/0043278 A1* | 2/2008 | Suzuki | 358/1.15 |
| 2008/0192287 A1* | 8/2008 | Iwai | 358/1.15 |
| 2008/0250385 A1* | 10/2008 | Sanchez | 717/100 |
| 2009/0022313 A1* | 1/2009 | Akiyama et al. | 380/243 |
| 2009/0284785 A1* | 11/2009 | Bando | 358/1.15 |

FOREIGN PATENT DOCUMENTS

| | | |
|---|---|---|
| JP | 2008-287332 | 11/2008 |
| JP | 2008-287526 | 11/2008 |

* cited by examiner

F I G. 16

YOU MAY NOT BE ABLE TO OPEN DOCUMENT FILE
IN DESIGNATED FILE FORMAT EVEN IF IT
IS STORED IN EXTERNAL NETWORK.
DO YOU STILL WANT TO EXECUTE SCANNING?

YES   NO

INFORMATION PROCESSING APPARATUS AND CONTROL METHOD THEREOF

This application is a National Stage application under 35 U.S.C. §371 of International Application No. PCT/JP2011/060680, filed on Apr. 27, 2011, which claims priority to Japanese Application No. 2010-109584, filed May 11, 2010, Japanese Application No. 2011-025339, filed Feb. 8, 2011, and Japanese Application No. 2011-094379, filed Apr. 20, 2011 the contents of each of the foregoing applications being incorporated by reference herein.

TECHNICAL FIELD

The present invention relates to an information processing apparatus connected via a plurality of networks to a Web server or the like having a file server function, and a control method thereof.

BACKGROUND ART

A multi-function peripheral (MFP) having a file server function is known. A Web server which provides a file server function as a service is also known. The Web server of this kind provides even a file reference tool as a service, which allows opening and editing a file even if a PC connected to the MFP via a local area network does not prepare reference software as long as the MFP has a Web browser. The user can store a document file in the file server of the MFP or in the Web server.

As a technique for maintaining security for a document file, it is known to encrypt the document file by a public key cryptosystem. It is also known to maintain security for a document file by arranging an access rights management server within a local area network, adding access rights management information called a policy to the document file, and managing access rights to the document file. Japanese Patent Laid-Open No. 2008-287332 proposes a technique of arranging an access rights management server on a plurality of networks and distributing policy information at the same time as a document file.

In some cases, a document file stored in the Web server cannot be opened using the reference tool of the Web server. For example, a document file encrypted by the above-mentioned public key cryptosystem cannot be decrypted unless a private key corresponding to the public key is acquired. In general, however, an apparatus such as the Web server cannot obtain the private key. To open a security policy-added document file using the reference tool of the Web server, the Web server needs to access a management server which manages the security policy. However, the management server is generally built in the local area network, and the Web server present outside the firewall cannot access the management server. In this case, the Web server cannot open the security policy-added document file.

Even if such a document file is saved in the Web server on the Internet, it cannot be opened using the reference tool of the Web server. The document file cannot be opened unless it is temporarily downloaded to a terminal device such as a PC within the local area network. This is a cumbersome work for the user.

The present invention provides a technique of downloading a securely-provided document file from a Web server to a terminal device without cumbersome work on the part of the user in an information processing apparatus connected to the Web server and terminal device.

SUMMARY OF INVENTION

According to one aspect of the present invention, there is provided an information processing apparatus capable of communicating with a document management service and a terminal device, the apparatus comprising: acceptance means for accepting, from the terminal device, an instruction about a document stored in the document management service; and instruction means for, when the document file has not been encrypted according to a public key cryptosystem, transmitting an instruction to the document management service to execute processing corresponding to the instruction accepted by the acceptance means, and when the document file has been encrypted according to the public key cryptosystem, transmitting an instruction to the document management service to directly transmit the encrypted document to the terminal device.

According to another aspect of the present invention, there is provided an information processing apparatus capable of communicating with a document management service, the apparatus comprising: acceptance means for accepting designation of a storage location of a document file; transmission means for transmitting the document file to the storage location accepted by the acceptance means; first determination means for determining whether the document management service is designated as the storage location of the document file; second determination means for determining whether encryption according to a public key cryptosystem is designated for the document file; and restriction means for, when the first determination means determines that the document management service is designated as the storage location of the document file and the second determination means determines that encryption according to the public key cryptosystem is designated for the document file, restricting transmission of the document file to the document management service by the transmission means.

According to still another aspect of the present invention, there is provided a method of controlling an information processing apparatus capable of communicating with a document management service and a terminal device, the method comprising: an acceptance step of accepting, from the terminal device, an instruction about a document stored in the document management service; and an instruction step of, when the document file has not been encrypted according to a public key cryptosystem, transmitting an instruction to the document management service to execute processing corresponding to the instruction accepted in the acceptance step, and when the document file has been encrypted according to the public key cryptosystem, transmitting an instruction to the document management service to directly transmit the encrypted document to the terminal device.

According to yet another aspect of the present invention, there is provided a method of controlling an information processing apparatus capable of communicating with a document management service, the method comprising: an acceptance step of accepting designation of a storage location of a document file; a transmission step of transmitting the document file to the storage location accepted in the acceptance step; a first determination step of determining whether the document management service is designated as the storage location of the document file; a second determination step of determining whether encryption according to a public key cryptosystem is designated for the document file; and a restriction step of, when the document management service is determined in the first determination step to be designated as the storage location of the document file and encryption according to the public key cryptosystem is determined in the second determination step to be designated for the document file, restricting transmission of the document file to the document management service in the transmission step.

Further features of the present invention will be apparent from the following description of exemplary embodiments with reference to the attached drawings.

BRIEF DESCRIPTION OF DRAWINGS

FIG. 16 is a view exemplifying a warning window in execution of reading in the third embodiment.

DESCRIPTION OF EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

<First Embodiment>

Figure 1:
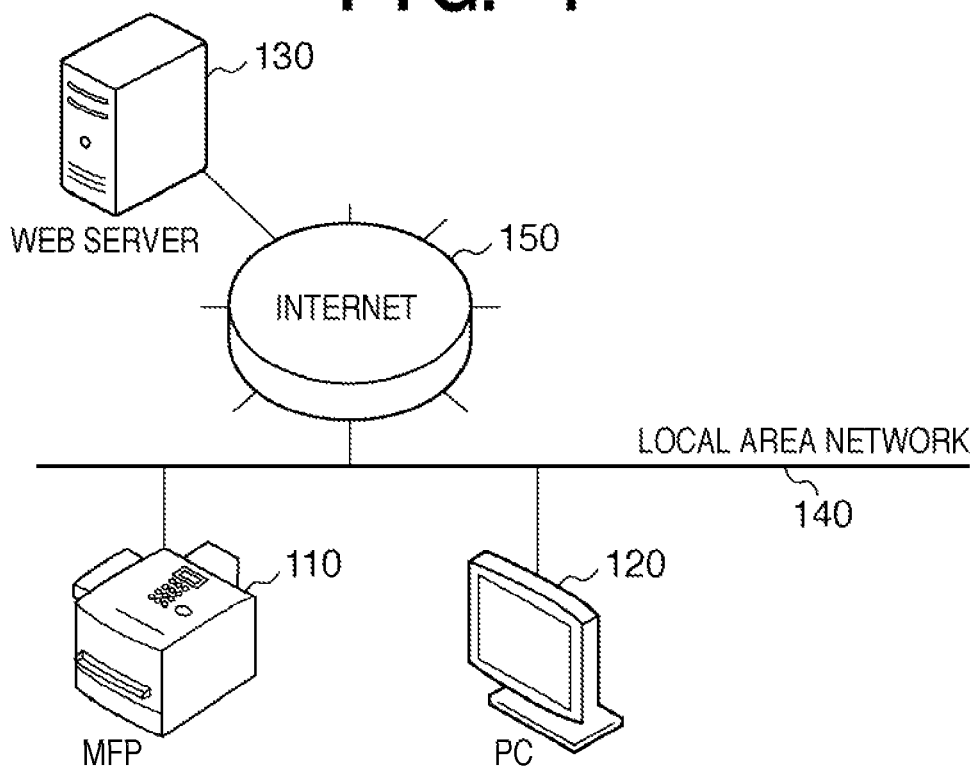
FIG. 1 is a view showing the configuration of an overall information processing apparatus system in the first embodiment.

FIG. 1 exemplifies the configuration of an overall information processing system in the first embodiment. An MFP 110 serving as an information processing apparatus and a PC 120 serving as a terminal device are connected via a local area network 140 serving as the first network. The MFP 110 and PC 120 are connected to a Web server 130 via the local area network 140, and the Internet 150 serving as the second network. Note that the local area network 140 is connected to the Internet 150 via a firewall apparatus (not shown). In the information processing system of the first embodiment, the PC 120 accesses the Web server 130 via the MFP 110. The PC 120 designates a document file stored in the Web server 130, and prints it using the MFP 110.

Figure 2:
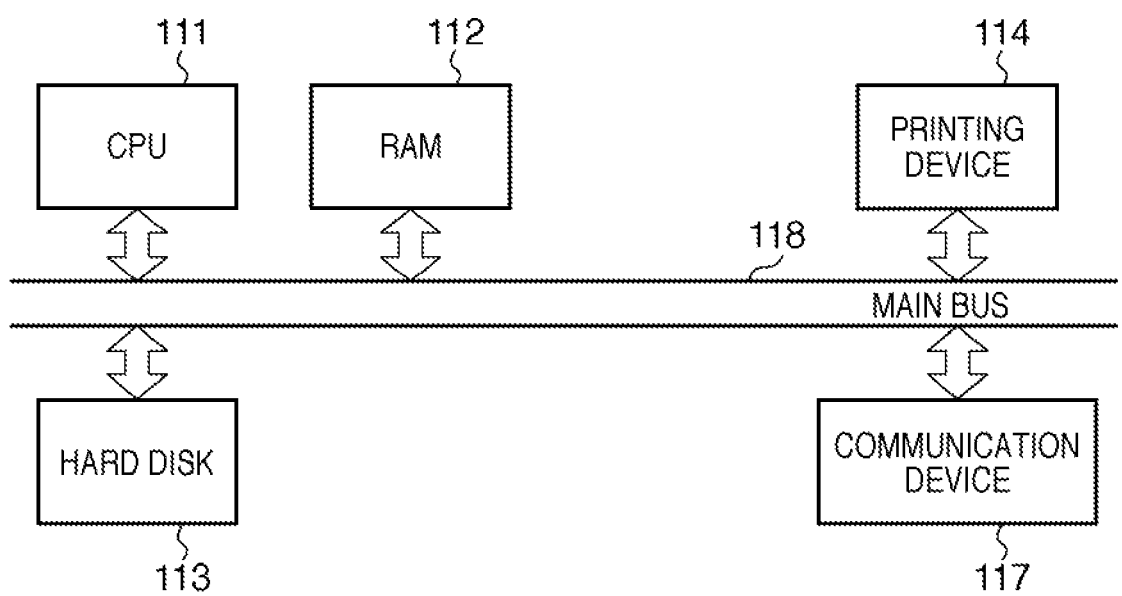
FIG. 2 is a block diagram for explaining the arrangement of an MFP in the first embodiment.

FIG. 2 is a block diagram exemplifying the arrangement of devices in the MFP 110 in the first embodiment. A CPU 111 controls all the devices of the MFP 110. A RAM 112 is a memory which provides a work area for the CPU 111. A hard disk 113 provides a program according to the present invention and stores various settings. An SSD (Solid State Drive) may replace the hard disk. A printing device 114 prints the image of electronic data on paper. A communication device 117 communicates with another device via a network.

A main bus 118 is used to exchange data between the CPU 111, the RAM 112, the hard disk 113, the communication device 117, and the printing device 114. In the first embodiment, the MFP 110 executes processes within it by controlling the RAM 112, hard disk 113, communication device 117, and printing device 114 by the CPU 111 via the main bus 118, unless otherwise specified.

Figure 3:
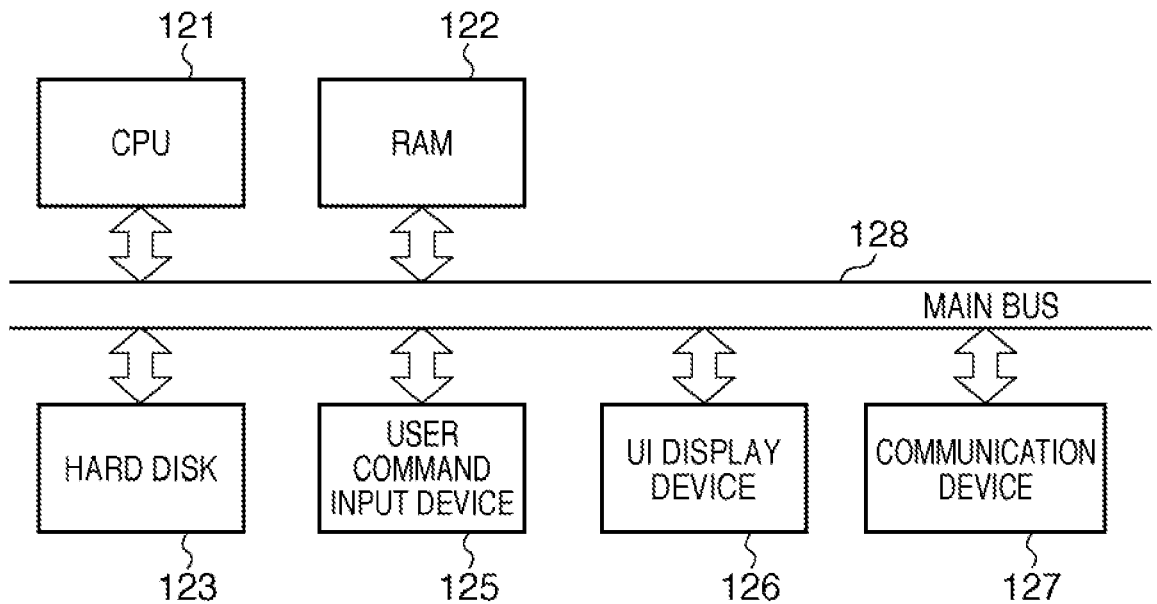
FIG. 3 is a block diagram for explaining the arrangement of a PC in the first embodiment.

FIG. 3 exemplifies the arrangement of devices in the PC 120 in the first embodiment. A CPU 121 controls all the devices of the PC 120. A RAM 122 provides a work area for the CPU 121. A hard disk 123 provides a program according to the present invention and stores various settings. An SSD (Solid State Drive) may replace the hard disk. A user command input device 125 is an input device for inputting a command by the user (including an installation user). A UI display device 126 displays a window in accordance with an instruction from the CPU 121. A communication device 127 communicates with another device via a network.

A main bus 128 is used to exchange data between the CPU 121, the RAM 122, the hard disk 123, the user command input device 125, the UI display device 126, and the communication device 127. Note that the PC 120 executes processes within it by controlling the RAM 122, hard disk 123, user command input device 125, UI display device 126, and communication device 127 by the CPU 121 via the main bus 128, unless otherwise specified.

Figure 4:
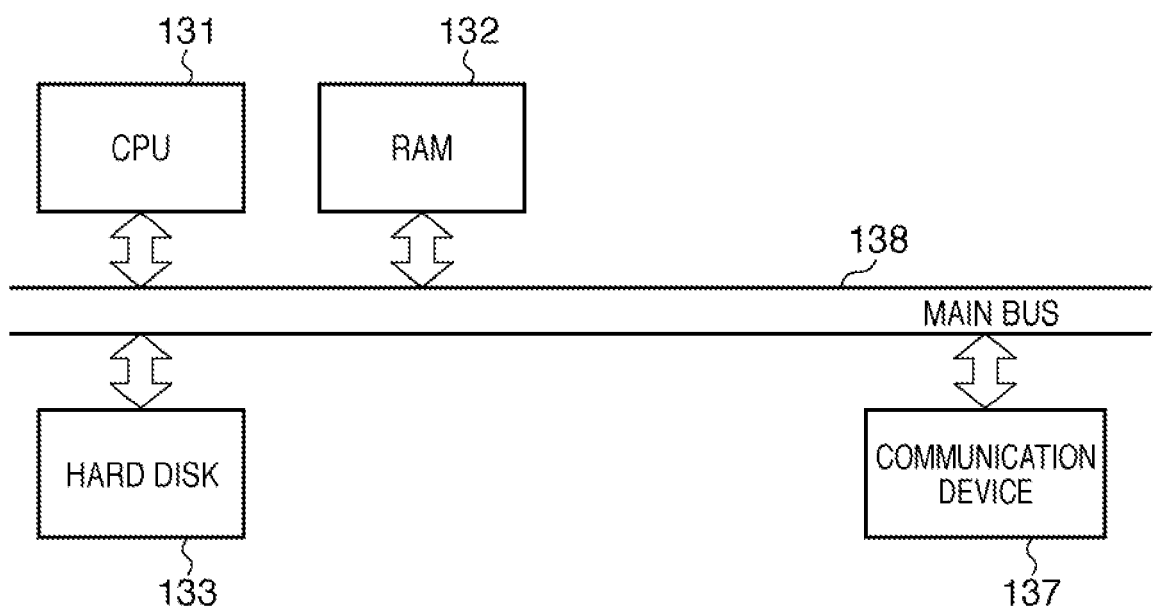
FIG. 4 is a block diagram for explaining the arrangement of a Web server in the first embodiment.

FIG. 4 exemplifies the arrangement of devices in the Web server 130 in the first embodiment. A CPU 131 controls all the devices of the Web server 130. A RAM 132 provides a work area for the CPU 131. A hard disk 133 stores programs and various kinds of setting information. An SSD (Solid State Drive) may replace the hard disk. A communication device 137 communicates with another device via a network.

A main bus 138 is used to exchange data between the CPU 131, the RAM 132, the hard disk 133, and the communication device 137. In the first embodiment, the Web server 130 executes processes within it by controlling the RAM 132, hard disk 133, and communication device 137 by the CPU 131 via the main bus 138, unless otherwise specified.

The Web server 130 operates as a document management server, and provides document reference and editing services. In general, even if a document file exists in the document management server, the user activates a program in the PC terminal and opens the document file for reference and editing. However, the Web server 130 according to the first embodiment provides reference and editing of a document file as Web services, and enables the above work without using the PC terminal resources.

Figure 5:
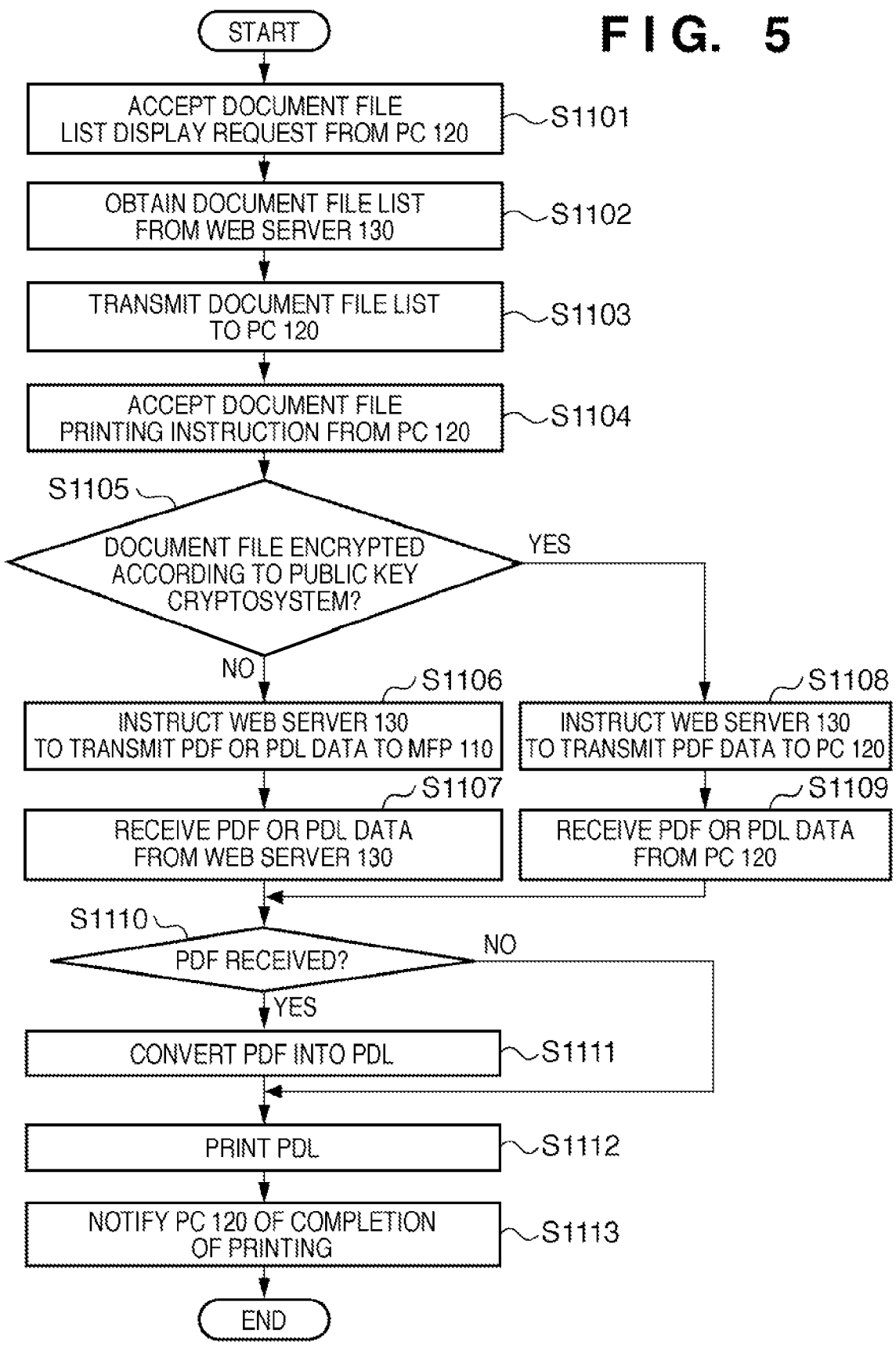
FIG. 5 is a flowchart for explaining execution of printing by the MFP in the first embodiment.

An example of utilizing a service in the Web server 130 using the Web browser of the PC terminal will be explained. FIG. 5 is a flowchart showing the operation sequence of the MFP 110 when executing printing in the first embodiment. This sequence is implemented by executing a program stored in the hard disk 113 by the CPU 111 of the MFP 110. In this example, the MFP 110 serves as an HTTP server. The PC 120 can access the MFP 110 via the Web browser, instruct it to print, and print a document file stored in the Web server 130.

A PDF file will be exemplified as a document file, but the document file is not limited to the PDF format.

In step S1101, the MFP 110 receives a document file list display request from the PC 120 via the communication device 117. In the first embodiment, the devices transmit/receive data and commands via the communication device 117, unless otherwise specified.

In step S1102, upon receiving the document file list display request, the MFP 110 obtains a document file list from the Web server 130. The MFP 110 may register the address of the Web server 130 in the hard disk 113 in advance. Alternatively, the address of the Web server 130 may be designated together with the document file list display request which has been accepted from the PC 120 in step S1101.

Upon completion of obtaining the document file list display request, the MFP 110 advances to step S1103, and transmits the document file list to the PC 120. In step S1104, the MFP 110 accepts a document file printing instruction from the PC 120. In step S1105, the MFP 110 obtains the attribute of a designated document file, and determines whether the document file has been encrypted according to the public key cryptosystem. The attribute of the document file may be obtained simultaneously when obtaining the document file list in step S1102, or separately obtained from the Web server 130 after designating the document file in step S1104.

If the MFP 110 determines in step S1105 that the document file has been encrypted according to the public key cryptosystem, it advances to step S1108. In step S1108, the MFP 110 instructs the Web server 130 to directly transmit the encrypted document file to the PC 120. An example of the encrypted document file format is an encrypted PDF format. For example, the Web server 130 transmits a document file to the PC 120 by the following method. The MFP 110 requests a document file of the Web server 130, and receives it as a response from the Web server 130. The MFP 110 transfers the received document file to the PC 120. According to this method, the Web server 130 can transmit a document file to the PC 120 even in the embodiment in which the firewall apparatus exists on the route between the Web server 130 and the PC 120. Then, the document file such as a PDF file is downloaded to the PC 120. The PC 120 decrypts, by using a private key corresponding to a public key, the document file which has been encrypted with the public key, and then opens the document file. The encrypted document file can therefore be opened without taking the private key out of the PC 120.

As another method of transmitting a document file from the Web server 130 to the PC 120 in step S1108, the Web server 130 may attach the document file to e-mail and transmit it to the e-mail address of the PC 120. In this case, assume that the Web server 130 can specify the e-mail address of the PC 120 (or its user).

In step S1109, the MFP 110 receives an instruction from the PC 120 to print the decrypted document file. Together with the printing instruction, the MFP 110 receives the decrypted document file or PDL (Page Description Language) data which has been generated by the PC 120 based on the decrypted document file. In the process of step S1108 or S1109, the MFP 110 may instruct the PC 120 to activate a program for opening the document file in the PC 120, or activate a printer driver. This obviates the need to manually activate the reference program or printer driver by the user. The MFP 110 receives the data in step S1109, and then shifts to step S1110.

If the MFP 110 determines in step S1105 that the document file has not been encrypted according to the public key cryptosystem, it advances to step S1106. In step S1106, the MFP 110 instructs the Web server 130 to transmit the document file to the MFP 110. An example of the file format may be the format (PDF format) of a document file stored in the Web server 130, or the PDF format generated in the Web server 130 based on the document file.

In step S1107, the MFP 110 receives the document file transmitted from the Web server 130 in accordance with the instruction issued in step S1106. The document file is then downloaded from the Web server 130 to the MFP 110. Upon completion of downloading, the MFP 110 shifts to step S1110.

In step S1110, the MFP 110 determines whether the received document file needs to be converted into print data. For example, the MFP 110 checks whether the document file has the PDF format or PDL format, and if the document file has the PDF format, determines that the document file needs to be converted into print data. If the MFP 110 determines in step S1110 that the document file needs to be converted, it advances to step S1111, converts the document file into print data for printing, and advances to step S1112. If the MFP 110 determines in step S1110 that the document file need not be converted, it advances to step S1112.

In step S1112, the MFP 110 causes the printing device 114 to print the document file. Finally in step S1113, upon completion of printing, the MFP 110 transmits a printing completion notification to the PC 120.

According to the flowchart of FIG. 5, the PC 120 can access the MFP 110 and instruct it to print a document file stored in the Web server 130. When the document file has been encrypted with a public key, it is temporarily downloaded to the PC 120 and decrypted by the PC 120. Since the document file can be decrypted without taking the private key out of the PC 120, security for the private key can be maintained. The document file is not decrypted by the Web server 130 outside the local area network 140, so security for the document file can be maintained. When the document file has not been encrypted with the public key, it can be printed by the MFP 110 without downloading it to the PC 120.

Figure 6:
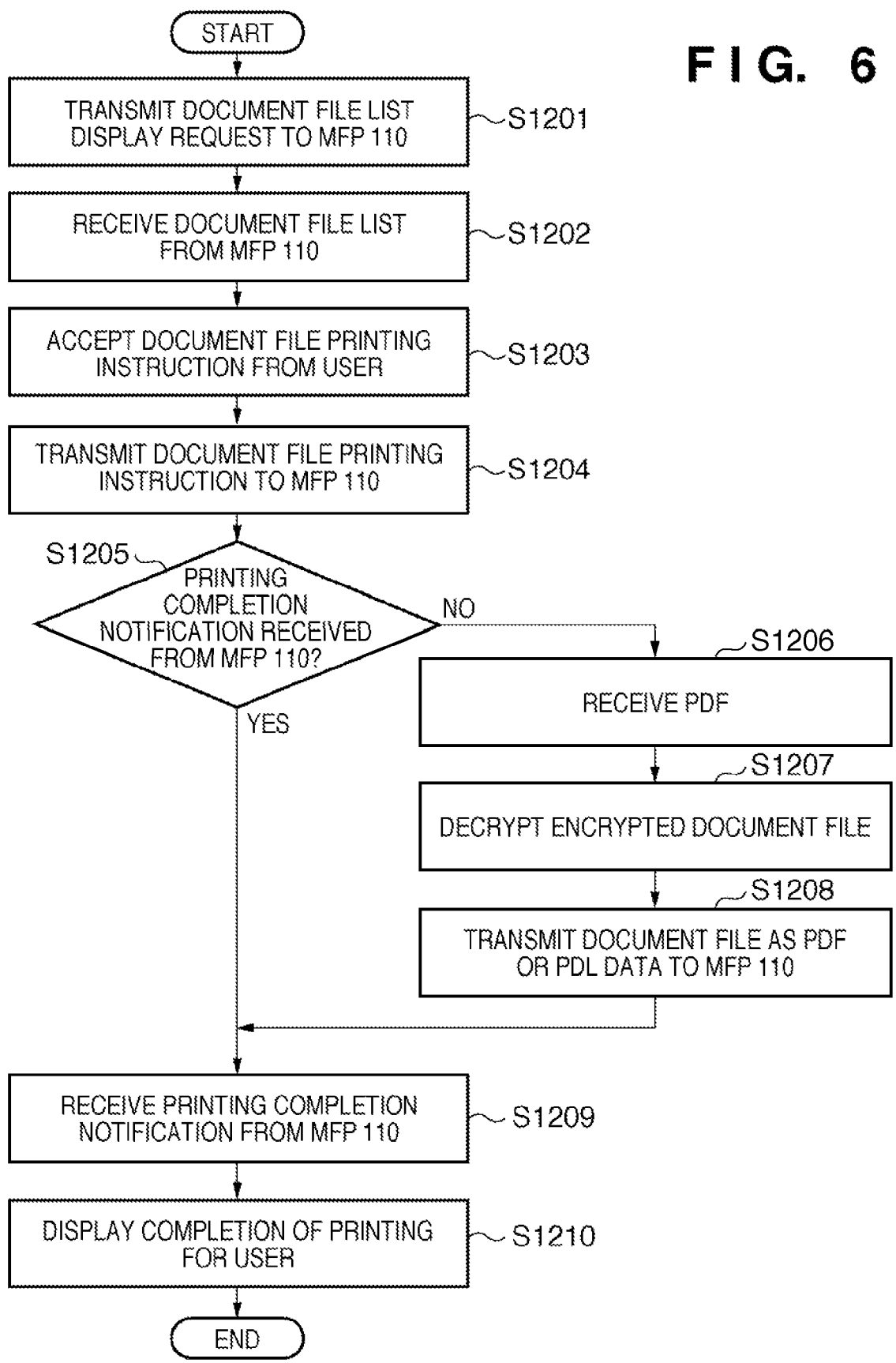
FIG. 6 is a flowchart for explaining execution of printing by the PC in the first embodiment.

FIG. 6 is a flowchart exemplifying a sequence executed by the PC 120 when executing printing in the first embodiment. This sequence is implemented by executing a program stored in the hard disk 123 by the CPU 121 of the PC 120. In step S1201, the PC 120 transmits a document file list request to the MFP 110 via the communication device 127. In the first embodiment, the devices transmit/receive data and commands via the communication device 127, unless otherwise specified.

In step S1202, the PC 120 receives a document file list from the MFP 110, and displays it on the UI display device 126. In step S1203, the PC 120 accepts designation of a document file and a printing instruction from the user via the user command input device 125. Exchange of such data with the user can be achieved using, for example, a Web browser. In step S1204, the PC 120 transmits the accepted printing instruction to the MFP 110.

In step S1205, the PC 120 determines whether data received after step S1204 is a printing completion notification from the MFP 110 or a document file from the Web server 130. If the PC 120 determines in step S1205 that the received data is a printing completion notification from the MFP 110 (YES in step S1205), it receives the printing completion notification from the MFP 110 in step S1209, and in step S1210, displays, on the UI display device 126, a message that printing is completed. Note that the MFP 110 executes the processes in steps S1104, S1105 (NO), and S1106 to S1113 in the flowchart of FIG. 5 until the PC 120 receives the printing completion notification from the MFP 110 after transmitting the document file printing instruction to the MFP 110 in step S1204.

If the PC 120 determines in step S1205 that the data received from the Web server 130 is a document file (NO in step S1205), it receives the document file from the Web server 130 in step S1206. This document file is one which has been transmitted from the Web server 130 in accordance with the instruction issued from the MFP 110 to the Web server in step S1108 of the flowchart of FIG. 5. Executing step S1108 in the flowchart of FIG. 5 by the MFP 110 means that it is determined in step S1105 that the document file has been encrypted with the public key. In other words, in step S1206, the document file transmitted from the Web server 130 has been encrypted with the public key. An example of the document file received from the Web server 130 is an encrypted PDF format. Upon receiving the document file, the PC 120 decrypts it in step S1207. At this time, if the document file has been encrypted according to the public key cryptosystem, a private key is necessary for decryption. Assume that the PC 120 can utilize the private key. For example, the private key may be stored in the hard disk 123 within the PC 120. Alternatively, the PC 120 may include an IC card reader (not shown) and decrypt the document file using a private key stored in an IC card.

In step S1208, the PC 120 transmits the decrypted document file to the MFP 110. An example of the file format in transmission to the MFP 110 is the PDF format or PDL format. After that, the PC 120 receives a printing completion notification from the MFP 110 in step S1209, and displays the completion of printing on the UI display device 126 in step S1210.

According to the first embodiment, the user who operates the PC 120 can print a document file stored in the Web server 130 as if the document file were stored in the MFP 110. Even if the document file has been encrypted by the public key cryptosystem, it can be decrypted without taking the private key out of the PC 120. Since the document file encrypted by the public key cryptosystem is not decrypted outside the local area network 140 (on the Internet), security for the document file can be maintained.

<Second Embodiment>

Figure 7:
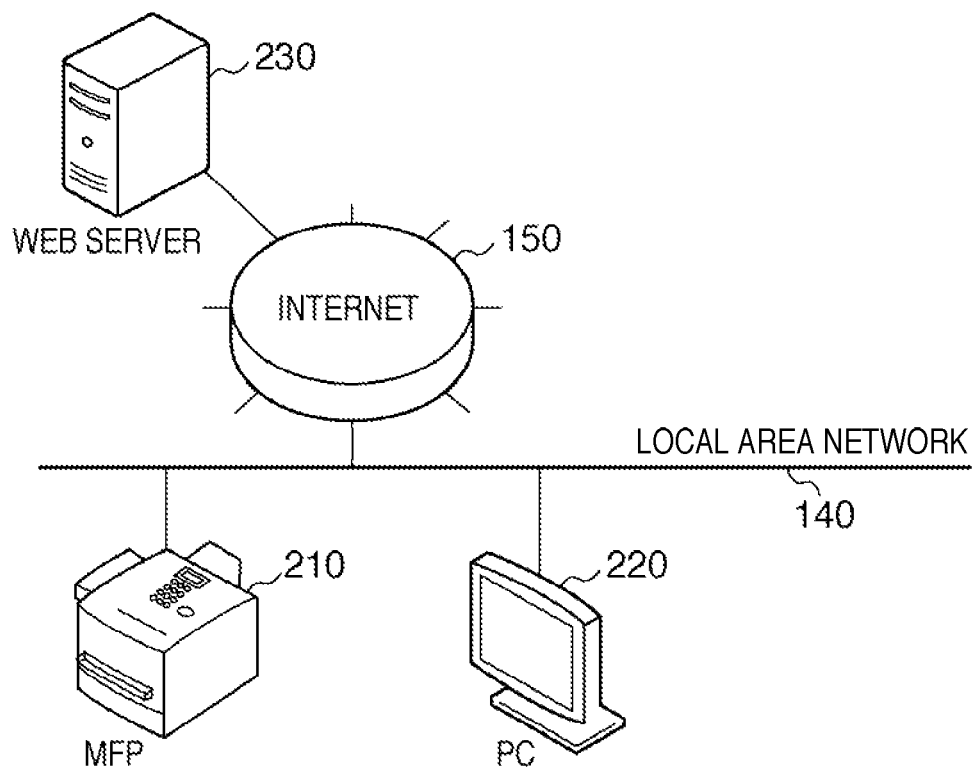
FIG. 7 is a view showing the configuration of an overall information processing apparatus system in the second embodiment.

FIG. 7 is a view exemplifying the configuration of an information processing system in the second embodiment. In the first embodiment, the PC 120 does not access the Web server 130. In the second embodiment, a PC 220 can access a Web server 230. An MFP 210 and the PC 220 are connected via a local area network 140. The MFP 210 and Web server 230 are connected via the Internet 150 and the local area network 140. Note that the local area network 140 is connected to the Internet 150 via a firewall apparatus (not shown). In the information processing system of the second embodiment, a document file present in the Web server 230 is designated from the PC 220 and printed by the MFP 210.

The device arrangements of the MFP 210, PC 220, and Web server 230 are the same as those of the MFP 110 in FIG. 2, the PC 120 in FIG. 3, and the Web server 130 in FIG. 4 described in the first embodiment, and a description thereof will not be repeated.

Figure 8:
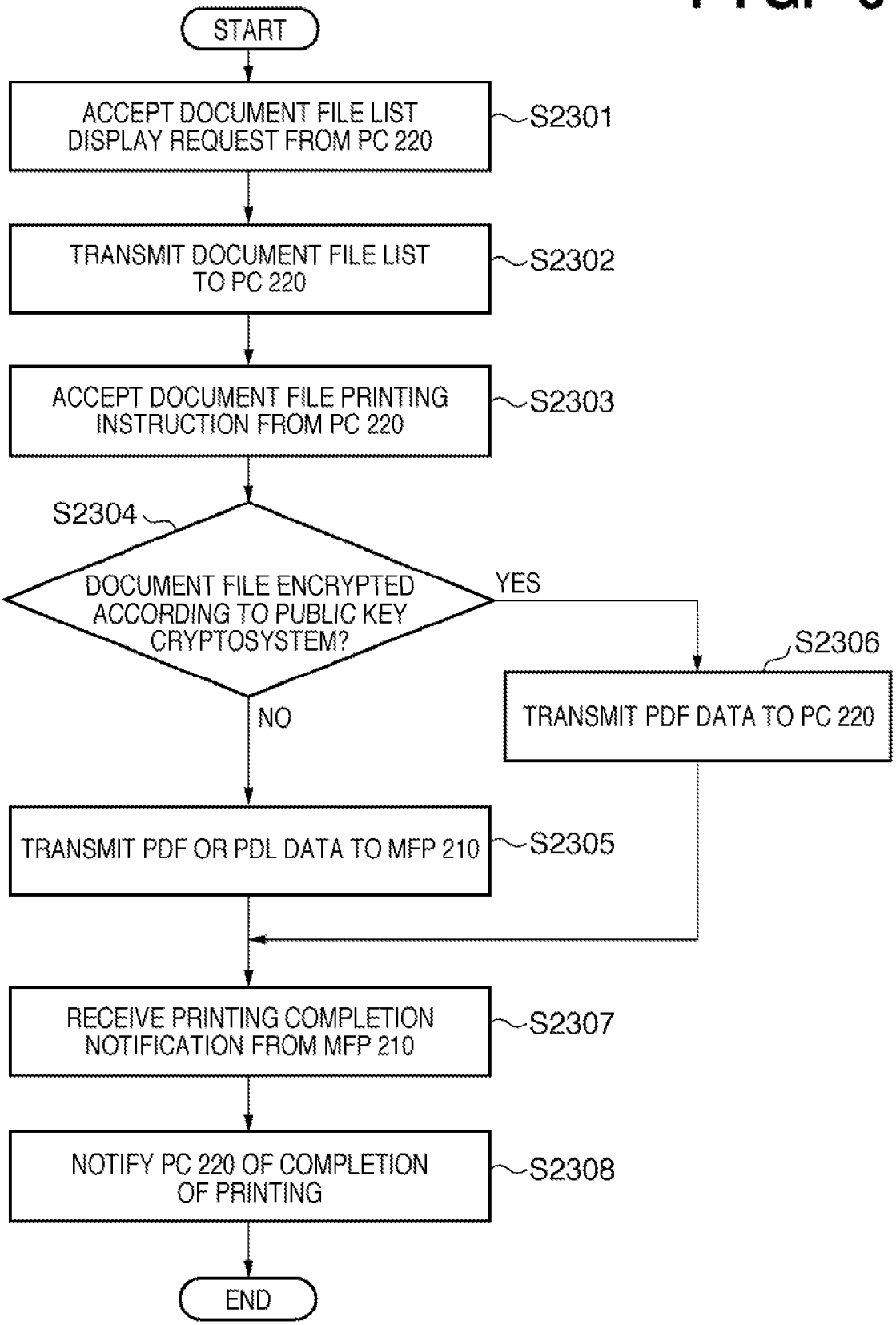
FIG. 8 is a flowchart for explaining execution of printing by a Web server in the second embodiment.

FIG. 8 is a flowchart exemplifying a sequence executed by the Web server 230 when executing printing in the second embodiment. This sequence is implemented by executing a program stored in a hard disk 133 by a CPU 131 of the Web server 230. In the second embodiment, the Web server 230 serves as an HTTP server. The PC 220 can access the Web server 230 via the Web browser, instruct it to print, and cause the MFP 210 to print a document file.

In step S2301, the Web server 230 receives a document file list display request from the PC 220 via a communication device 137. In the second embodiment, the devices transmit/receive data and commands via the communication device 137, unless otherwise specified.

In step S2302, as the first transmission, the Web server 230 transmits a document file list to the PC 220 in response to the received request. In step S2303, the Web server 230 receives a document file printing instruction from the PC 220. In step S2304, the Web server 230 checks the attribute of a document file designated in step S2303, and determines whether the document file has been encrypted according to the public key cryptosystem.

If the Web server 230 determines in step S2304 that the document file has been encrypted according to the public key cryptosystem, it directly transmits the encrypted document file to the PC 220 as the second transmission in step S2306. An example of the encrypted file format is an encrypted PDF format. In this step, the encrypted document file is downloaded to the PC 220. After that, the Web server 230 may instruct the PC 220 to activate a program for opening the document file in the PC 220, or activate a printer driver. This obviates the need to manually activate the reference program or printer driver by the user. The Web server 230 then shifts to step S2307.

If the Web server 230 determines in step S2304 that the document file has not been encrypted according to the public key cryptosystem, it transmits the document file to the MFP 210 in step S2305. An example of the file format is the PDF format or PDL format. For example, the Web server 230 transmits a document file to the MFP 210 by the following method. The PC 220 requests a document file of the Web server 230, and receives it as a response from the Web server 230. The PC 220 transfers the received document file to the MFP 210. According to this method, the Web server 230 can transmit a document file to the MFP 210 even in the embodiment in which the firewall apparatus exists on the route between the Web server 230 and the MFP 210. At this time, assume that the printing instruction received in step S2303 contains the address of the MFP 210. Based on the address, the document file is downloaded to the MFP 210. Upon completion of downloading, the Web server 230 shifts to step S2307.

As another method of transmitting a document file from the Web server 230 to the MFP 210 in step S2305, the Web server 230 may attach the document file to e-mail and transmit it to the e-mail address of the PC 220. In this case, assume that the Web server 230 can specify the e-mail address of the MFP 210.

In step S2307, the Web server 230 receives a printing completion notification from the MFP 210. In step S2308, the Web server 230 transmits the printing completion notification to the PC 220.

Figure 9:
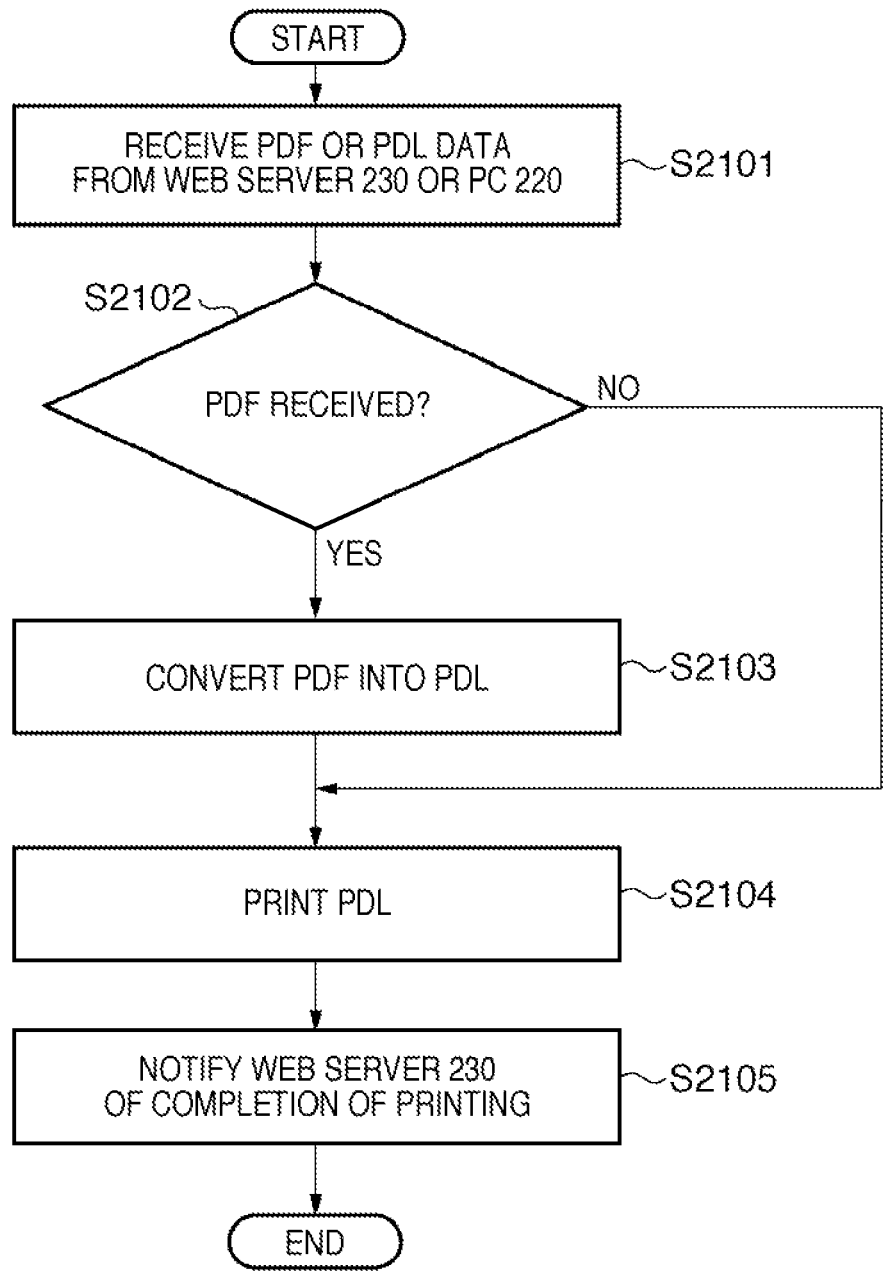
FIG. 9 is a flowchart for explaining execution of printing by an MFP in the second embodiment.

FIG. 9 is a flowchart exemplifying a sequence executed by the MFP 210 when executing printing in the second embodiment. This sequence is implemented by executing a program stored in a hard disk 113 by a CPU 111 of the MFP 210. In step S2101, the MFP 210 receives a document file from the Web server 230 or PC 220 via a communication device 117. In the second embodiment, the devices transmit/receive data and commands via the communication device 117, unless otherwise specified. An example of the file format is the PDF format or PDL format.

In step S2102, the MFP 210 determines whether the received document file needs to be converted into print data. For example, the MFP 210 checks whether the document file has the PDF format or PDL format, and if the document file has the PDF format, determines that the document file needs to be converted into print data. If the MFP 210 determines that the document file needs to be converted into print data, it converts the document file into print data in step S2103, and shifts to step S2104. If the MFP 210 determines that the document file need not be converted into print data, it advances to step S2104.

In step S2104, the MFP 210 causes a printing device 114 to print the document file. Finally in step S2105, upon completion of printing, the MFP 210 transmits a printing completion notification to the Web server 230. The address of the Web server 230 that is used at this time may be received simultaneously when receiving the document file from the PC 220.

Figure 10:
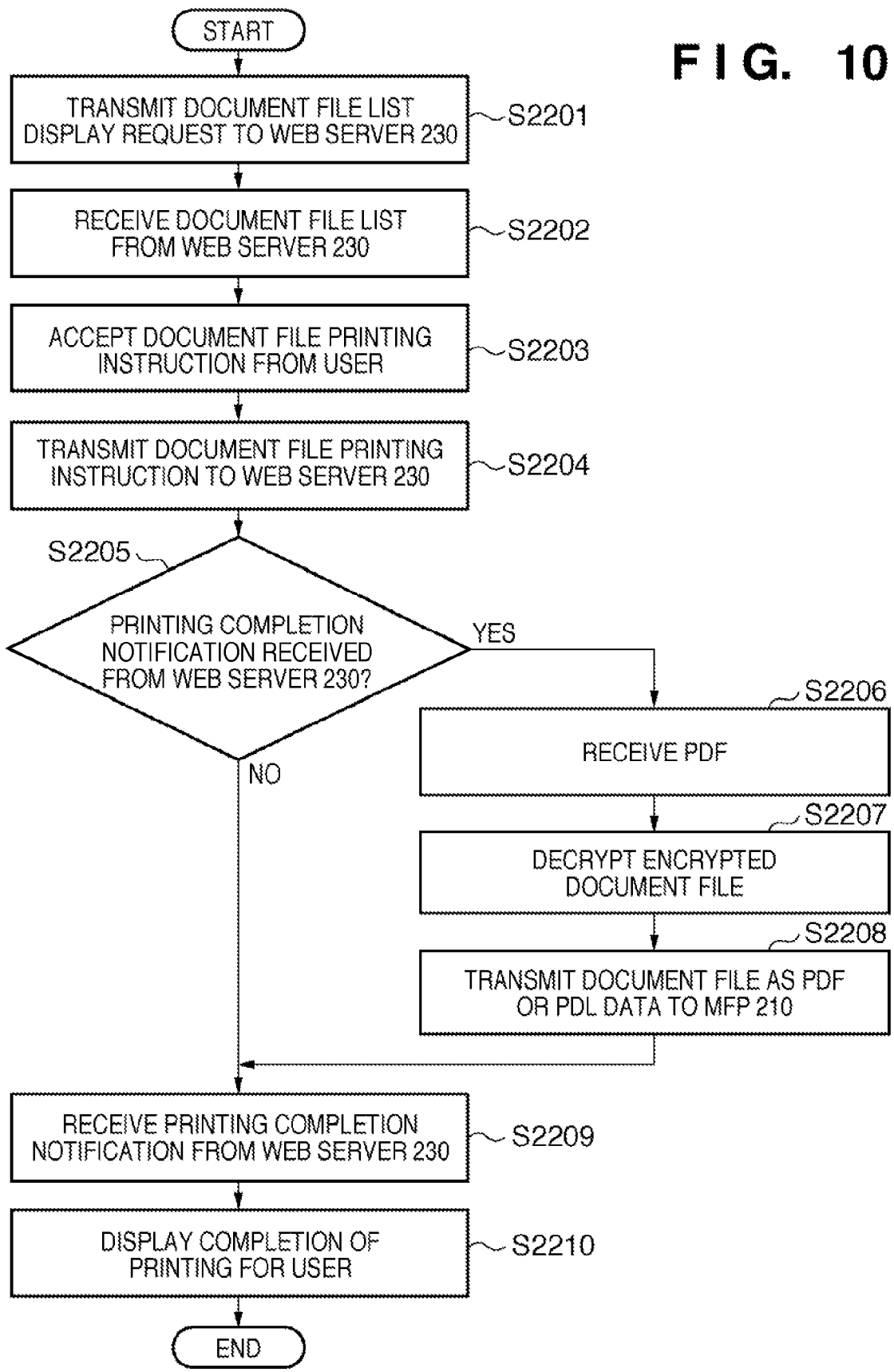
FIG. 10 is a flowchart for explaining execution of printing by a PC in the second embodiment.

FIG. 10 is a flowchart exemplifying a sequence executed by the PC 220 when executing printing in the second embodiment. This sequence is implemented by executing a program stored in a hard disk 123 by a CPU 121 of the PC 220. In step S2201, the PC 220 transmits a document file list request to the Web server 230 via a communication device 127. In the second embodiment, the devices transmit/receive data and commands via the communication device 127, unless otherwise specified.

In step S2202, the PC 220 receives a document file list from the Web server 230, and displays it on a UI display device 126. In step S2203, the PC 220 accepts designation of a document file and a printing instruction from the user via a user command input device 125. Exchange of such data with the user can be achieved using, for example, a Web browser. In step S2204, the PC 220 transmits the accepted printing instruction to the Web server 230.

In step S2205, the PC 220 determines whether data received after step S2204 is a printing completion notification from the Web server 230 or a document file from the Web server 230. If the PC 220 determines in step S2205 that the received data is a printing completion notification from the Web server 230 (YES in step S2205), it receives the printing completion notification from the Web server 230 in step S2209, and in step S2210, displays, on the UI display device 226, a message that printing is completed. Note that the Web server 230 executes the processes in steps S2303, S2304 (NO), and S2305 to S2308 in the flowchart of FIG. 8 until the PC 220 receives the printing completion notification from the Web server 230 after transmitting the document file printing instruction to the Web server 230 in step S2204.

If the PC 220 determines in step S2205 that the data received from the Web server 230 is a document file (NO in step S2205), it receives the document file from the Web server 230 in step S2206. This document file is one which has been transmitted from the Web server 230 in step S2306 of the flowchart of FIG. 8. Executing step S2306 in the flowchart of FIG. 8 by the Web server 230 means that it is determined in step S2304 that the document file has been encrypted with the public key. In other words, in step S2206, the document file transmitted from the Web server 230 has been encrypted with the public key. An example of the document file received from the Web server 230 is an encrypted PDF format. Upon receiving the document file, the PC 220 decrypts it in step S2207. At this time, if the document file has been encrypted according to the public key cryptosystem, a private key is necessary for decryption. Assume that the PC 220 can utilize the private key. For example, the private key may be stored in the hard disk 123 within the PC 220. Alternatively, the PC 220 may include an IC card reader (not shown) and decrypt the document file using a private key stored in an IC card.

In step S2208, the PC 220 transmits the decrypted document file to the MFP 210. An example of the file format in transmission to the MFP 210 is the PDF format or PDL format. After that, the PC 220 shifts to step S2209.

In step S2209, the PC 220 receives a printing completion notification from the Web server 230. In step S2210, the UI display device 126 of the PC 220 displays the completion of printing for the user.

According to the second embodiment, even if the document file has been encrypted by the public key cryptosystem, it can be decrypted without taking the private key out of the PC 220. Since the document file encrypted according to the public key cryptosystem is not decrypted outside the local area network (on the Internet), security for the document file can be maintained.

<Third Embodiment22

Figure 11:
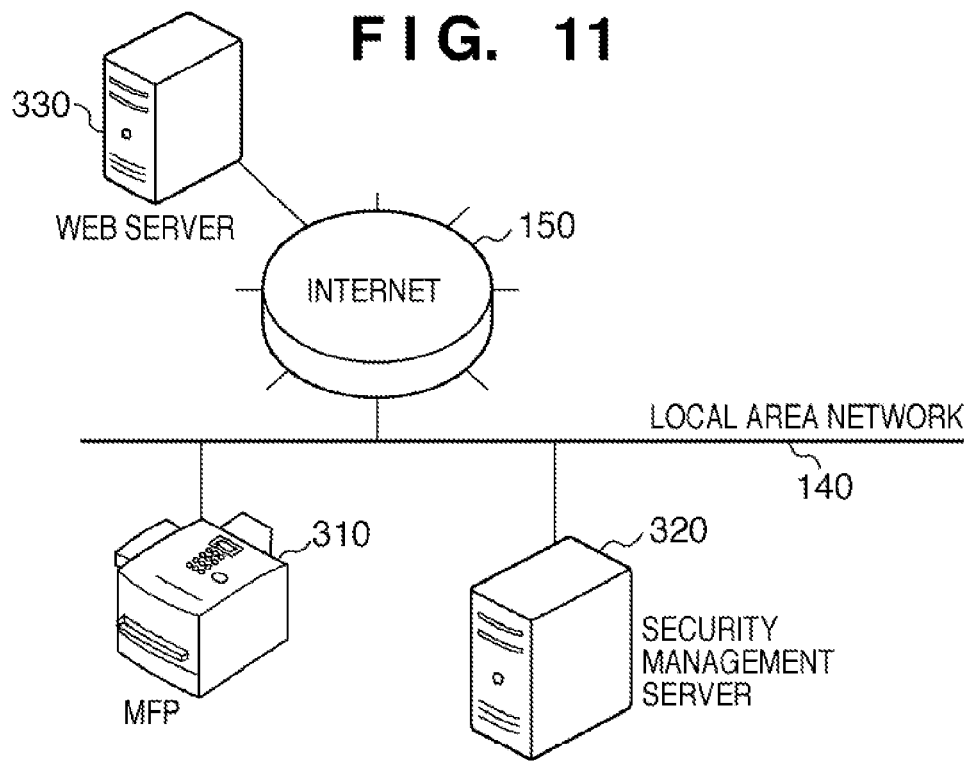
FIG. 11 is a view showing the configuration of an overall information processing apparatus system in the third embodiment.

FIG. 11 is a view exemplifying the configuration of an information processing system in the third embodiment. An MFP 310 and security management server 320 are connected via a local area network 140. The MFP 310 and a Web server 330 are connected via the Internet 150 and the local area network 140. Note that the local area network 140 is connected to the Internet 150 via a firewall apparatus (not shown). In the information processing system of the third embodiment, the MFP 310 reads a document, converts it into a document file, and saves the document file in the MFP 310, security management server 320, or Web server 330. The security management server 320 manages access rights to a document file. When the MFP 310 or another apparatus is to open a document file whose access rights are managed by the security management server 320, it must query the security management server 320 for access rights. A document file whose access is managed by the security management server 320 will be called a security policy-added document file.

Figure 12:
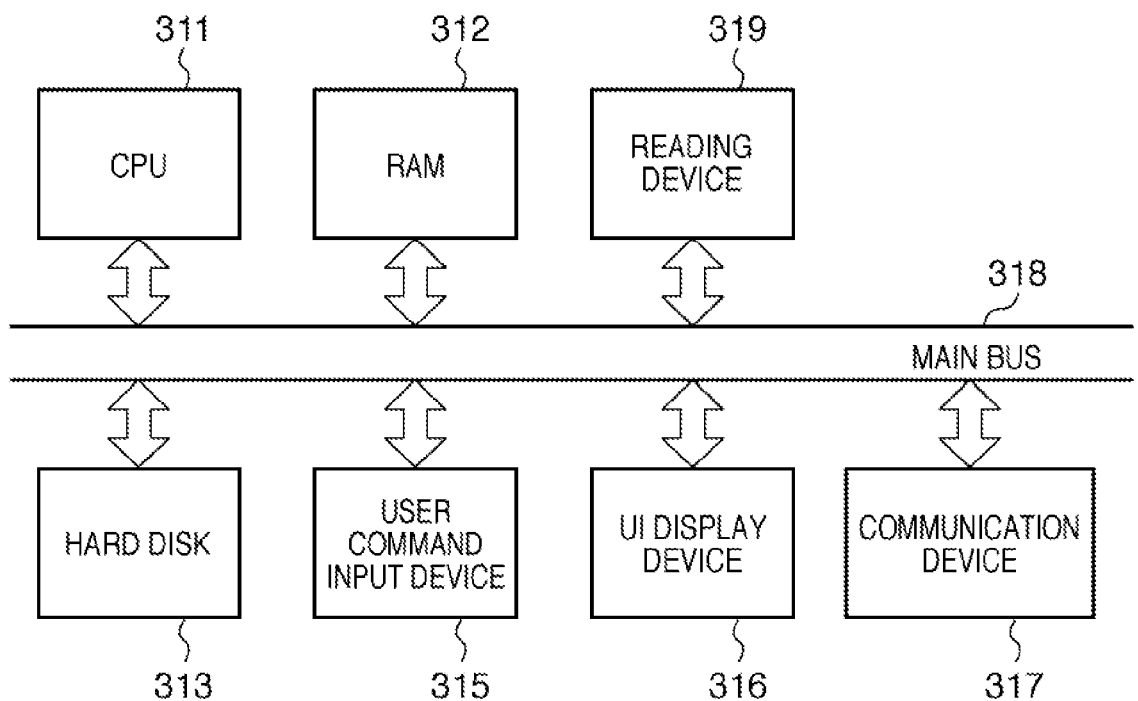
FIG. 12 is a block diagram for explaining the arrangement of an MFP in the third embodiment.

FIG. 12 is a block diagram exemplifying the arrangement of devices in the MFP 310 in the third embodiment. A CPU 311 controls all the devices of the MFP 310. A RAM 312 is a memory which provides a work area for the CPU 311. A hard disk 313 provides a program according to the present invention and stores various settings. An SSD (Solid State Drive) may replace the hard disk. A user command input device 315 is used to input a command by the user (including an installation user). A UI display device 316 displays a window in accordance with an instruction from the CPU 311. A reading device 319 reads an image on paper as electronic data. A communication device 317 communicates with another device via a network.

A main bus 318 is used to exchange data between the CPU 311, the RAM 312, the hard disk 313, the user command input device 315, the reading device 319, and the communication device 317. Note that the MFP 310 executes processes within it by controlling the RAM 312, hard disk 313, user command input device 315, reading device 319, and communication device 317 by the CPU 311 via the main bus 318, unless otherwise specified.

Figure 13:
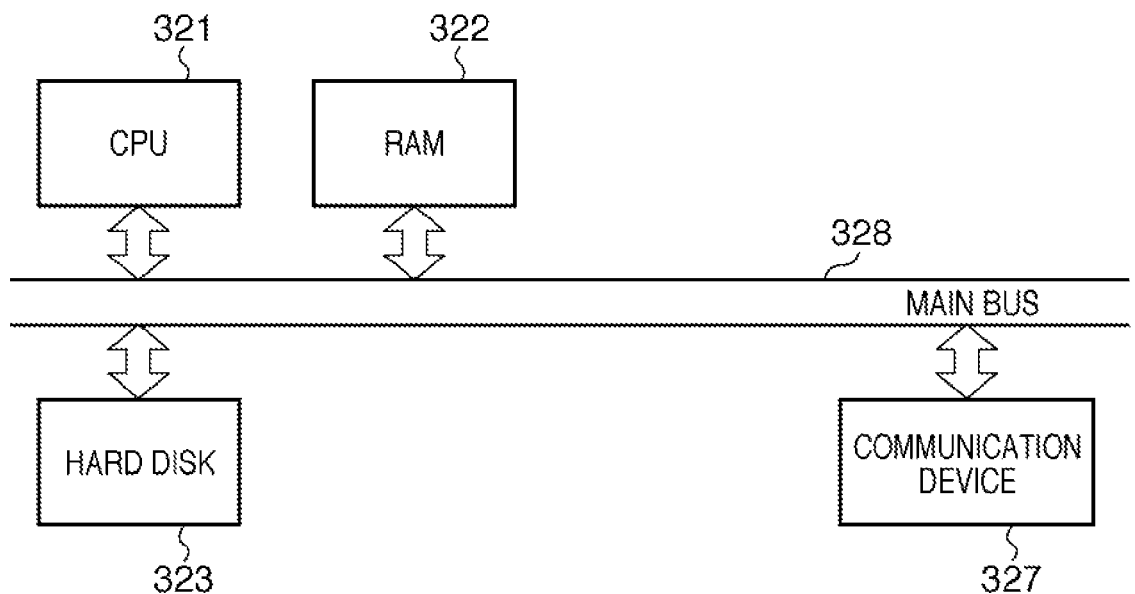
FIG. 13 is a block diagram for explaining the arrangement of a security management server in the third embodiment.

FIG. 13 is a block diagram exemplifying the arrangement of devices in the security management server 320 in the third embodiment. A CPU 321 controls all the devices of the security management server 320.

A RAM 322 is a memory which provides a work area for the CPU 321. A hard disk 323 stores programs and various kinds of setting information. An SSD (Solid State Drive) may replace the hard disk. A communication device 327 communicates with another device via a network.

A main bus 328 is used to exchange data between the CPU 321, the RAM 322, the hard disk 323, and the communication device 327. In the third embodiment, the security management server 320 executes processes within it by controlling the RAM 322, hard disk 323, and communication device 327 by the CPU 321 via the main bus 328, unless otherwise specified. The security management server 320 may be configured as the same device as the MFP 310.

Figure 14:
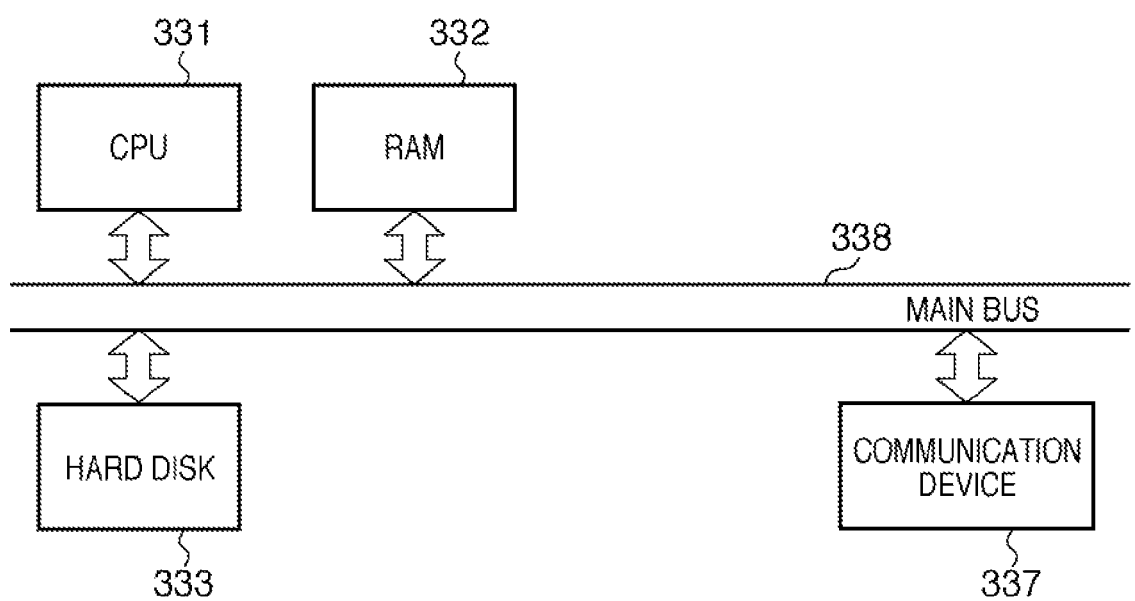
FIG. 14 is a block diagram for explaining the arrangement of a Web server in the third embodiment.

FIG. 14 is a block diagram exemplifying the arrangement of devices in the Web server 330 in the third embodiment. A CPU 331 controls all the devices of the Web server 330. A RAM 332 is a memory which provides a work area for the CPU 331. A hard disk 333 provides a program according to the present invention and stores various settings. An SSD (Solid State Drive) may replace the hard disk. A communication device 337 communicates with another device via a network.

A main bus 338 is used to exchange data between the CPU 331, the RAM 332, the hard disk 333, and the communication device 337. In the third embodiment, the Web server 330 executes processes within it by controlling the RAM 332, hard disk 333, and communication device 337 by the CPU 331 via the main bus 338, unless otherwise specified.

Figure 15A:
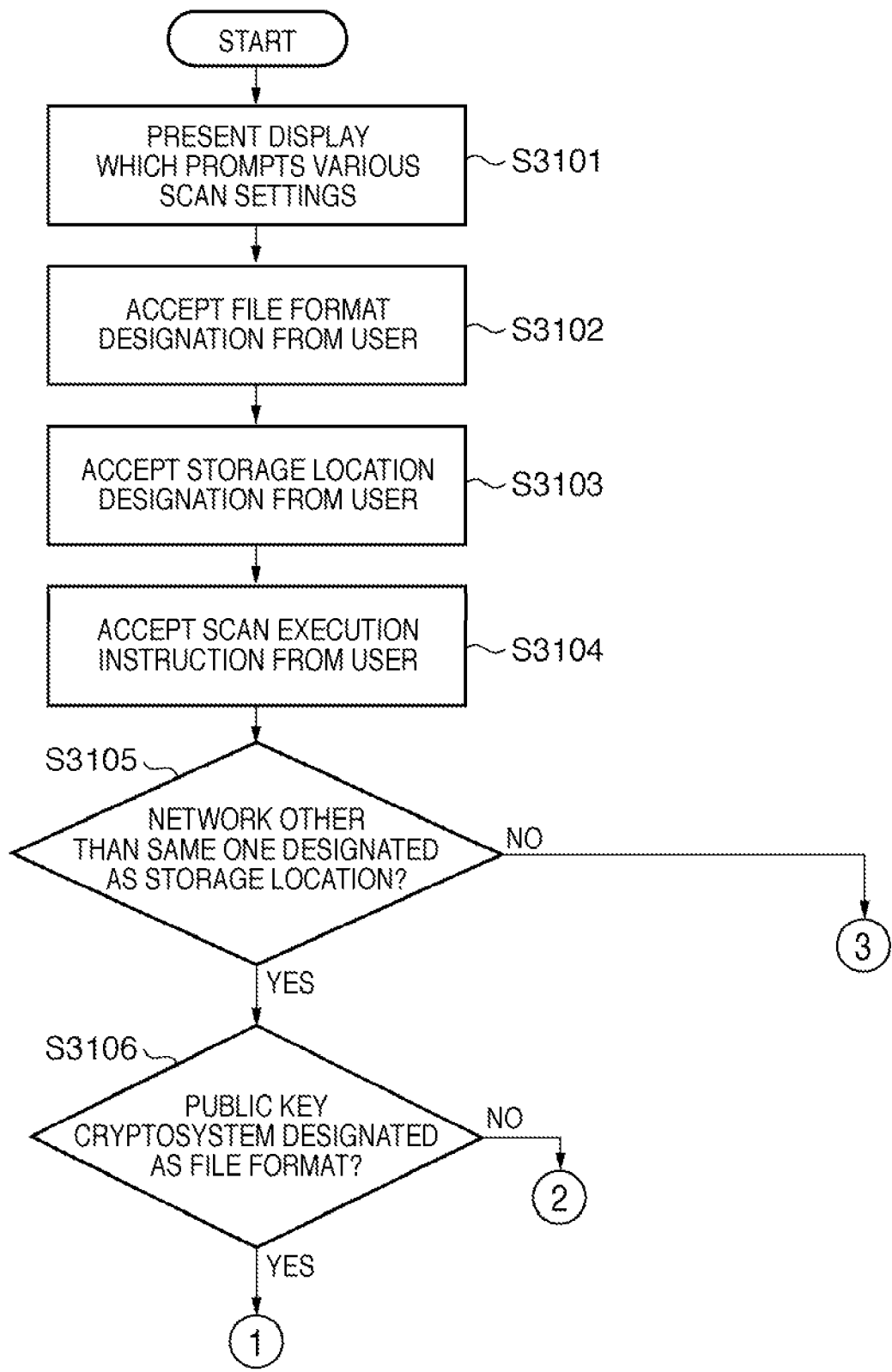
FIGS. 15A and 15B are flowcharts for explaining execution of reading by the MFP in the third embodiment.
Figure 15B:
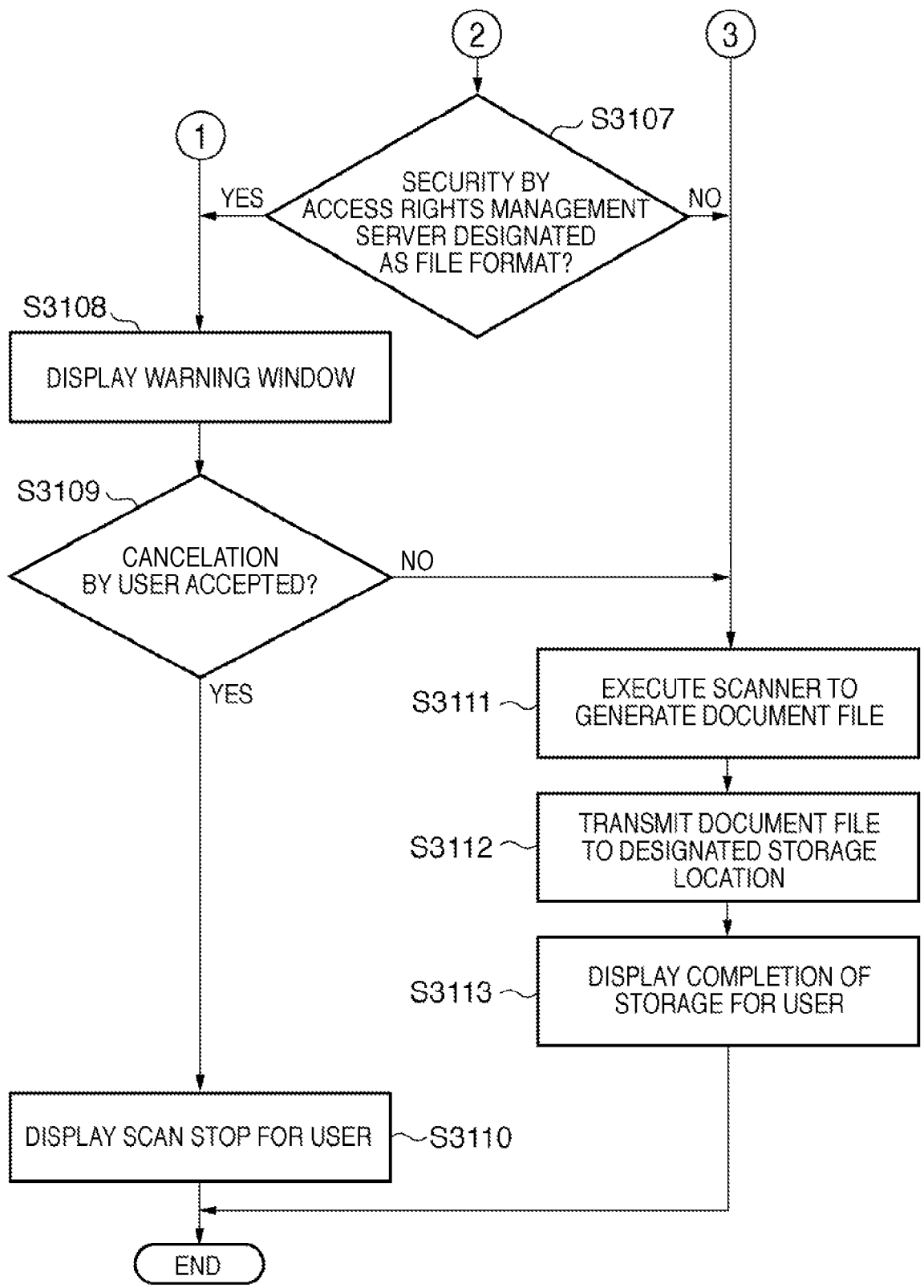

FIGS. 15A and 15B are flowcharts exemplifying the operation sequence of the MFP 310 when executing printing in the third embodiment. This sequence is implemented by executing a program stored in the hard disk 313 by the CPU 311 of the MFP 310. In step S3101, the MFP 310 controls the UI display device 316 to display a window which prompts the user to make settings regarding document reading by the reading device 319. Examples of the settings are the file format setting of image data to be generated from a read document, the storage location setting when storing generated image data as a document file, and the reading resolution setting.

In step S3102, the MFP 310 accepts a file format setting input by operating the user command input device 315 by the user. The file format setting includes a color/monochrome setting, file format designation such as the TIFF format or PDF format, and file encryption setting such as password encryption or public key encryption.

In step S3103, the MFP 310 accepts a file storage location setting input by operating the user command input device 315 by the user. The storage location setting contents include information for specifying an apparatus, and information for specifying a folder or directory, such as a URL.

In step S3104, the MFP 310 accepts a reading execution instruction from the user via the user command input device 315. In step S3105, as the first determination, the MFP 310 determines whether the set storage location is within the same network as the local area network 140 connected to the MFP 310, or outside the local area network 140 (for example, the Internet 150). More specifically, the set storage location is determined from the network domain. If the MFP 310 determines in step S3105 that the set storage location is within the same network, it shifts to step S3111.

If the MFP 310 determines in step S3105 that the set storage location is outside the same network, it shifts to step S3106. In step S3106, as the second determination, the MFP 310 determines whether the file format setting is the public key cryptosystem. If the MFP 310 determines in step S3106 that the file format setting is the public key cryptosystem (YES), it advances to step S3108. If the MFP 310 determines in step S3106 that the file format setting is not the public key cryptosystem (NO), it shifts to step S3107.

In step S3107, as the third determination, the MFP 310 determines whether the file format has a setting of adding a security policy to a document file by an access rights management server (not shown) within the same network (local area network 140). The security policy is information which defines access rights to a document file. In the third embodiment, the security management server 320 manages a security policy for a document file. When opening or printing a security policy-added document file, the MFP 310 needs to access the security management server 320 and inquire about the security policy of the document file. If the MFP 310 determines that the file format does not have a setting of adding a security policy (NO), it advances to step S3111. If the MFP 310 determines that the file format has a setting of adding a security policy (YES), it advances to step S3108 and displays a warning window on the UI display device 316.

FIG. 16 is a view exemplifying a warning window display. For example, when the storage location is the Web server 330, a document file encrypted according to the public key cryptosystem or a security policy-added document file cannot be opened using the reference tool of the Web server 330. Opening a document file encrypted according to the public key cryptosystem requires a private key corresponding to the public key. However, it is not good in terms of security to transfer the private key to the Web server 330 on the Internet 150. The Web server 330 can neither obtain the private key nor open the document file encrypted according to the public key cryptosystem. To open a security policy-added document file by the Web server 330, the Web server 330 needs to inquire about access rights to the document file of the security management server 320 in the local area network 140. However, in general, a firewall (not shown) is installed in the local area network 140, so the Web server 330 cannot query the security management server 320 regarding access rights. Thus, the Web server 330 cannot open the security policy-added document file. Even if a document file is saved in the Web server 330, it needs to be downloaded to the PC of the user when he is to refer to the document file, and cumbersome work is inevitable. For this reason, transmission of a document file to the Web server 330 is restricted. From a warning window as shown in FIG. 16, the user can take a measure such as change of the storage location.

Note that the warning window in FIG. 16 may include in more detail a message which notifies the user that "document data encrypted according to the public key cryptosystem cannot be stored in a designated storage destination" or a message which notifies the user that "a security policy-added document file cannot be stored in a designated storage destination".

After displaying the warning window, the MFP 310 determines in step S3109 whether it has accepted cancellation of reading from the user. If the MFP 310 determines in step S3109 that it has accepted cancellation (the user has pressed "NO" on the warning window of FIG. 16), it advances to step S3110, displays, on the UI display device 316, a message that reading stops, and ends the process. If the MFP 310 determines in step S3109 that it has not accepted cancellation (the user has pressed "YES" on the warning window of FIG. 16), it advances to step S3111, executes reading of a document by scanning it by the reading device 319, and executes conversion processing into a document file, generating a converted document file. After the end of conversion processing, the MFP 310 transmits the document file to the designated storage location in step S3112. In step S3113, the MFP 310 displays, on the UI display device 316 for the user, a message that the storage is completed, and then ends the process.

Other Embodiments

The system configuration of FIG. 11 described in the third embodiment may be applied to the first embodiment. That is, the security management server 320 is added to the system configuration of FIG. 1. In this system configuration, the first or second embodiment may be implemented as follows.

A security policy-added document file cannot be opened unless the security management server 320 is queried for access rights. Since a firewall (not shown) intervenes between the Web server 130 and the security management server 320, the Web server 130 cannot access the security management server 320. In other words, even a security policy-added document file is handled as a file which cannot be opened by the Web server 130, similar to a document file encrypted by the public key cryptosystem which has been described in the first and second embodiments.

More specifically, in step S1105 of the flowchart of FIG. 5 in the first embodiment, the MFP 110 obtains the attribute of a designated document file, determines whether the document file has been encrypted according to the public key cryptosystem, and in addition determines whether the security policy has been added to the document file. If the MFP 110 determines that the security policy has been added to the file, it advances to step S1108. After the PC 120 queries the security management server 320 for access rights, the PC 120 opens the document file, and instructs the MFP 110 to print it in the PDL or PDF data format.

In this case, not the PC 120 but the MFP 110 may obtain a document file from the Web server 130, and query the security management server 320 regarding access rights to the document file.

In the first to third embodiments, the Web server 130, 230, or 330 may provide the document management service as a cloud service using a plurality of servers.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2010-109584 filed May 11, 2010, No. 2011-025339 filed Feb. 8, 2011 and No. 2011-094379 filed Apr. 20, 2011, which are hereby incorporated by reference herein in their entirety.

The invention claimed is:

1. An information processing apparatus connected to a first network and which communicates with a document management service connected to a second network outside of the first network, the apparatus comprising:
   acceptance means for accepting designation of a storage location of a document file;
   transmission means for transmitting the document file to the storage location accepted by said acceptance means;
   first determination means for determining whether the document management service connected to the second network outside of the first network is designated as the storage location of the document file;
   second determination means for determining whether encryption according to a public key cryptosystem is designated for the document file; and
   a display that, when said first determination means determines that the document management service is designated as the storage location of the document file and said second determination means determines that encryption according to the public key cryptosystem is designated for the document file, displays a warning screen regarding storing the document file by the document management service,
   wherein the transmission means transmits the document file to the document management service in a case where a user confirms the transmission via the warning screen, and the transmission means does not transmit the document file to the document management service in a case where the user confirms not to transmit the document file via the warning screen.

2. The apparatus according to claim 1, wherein
   the information processing apparatus further comprises third determination means for determining whether the document file is a file whose access rights are managed by a security management server connected to the first network, and
   when said first determination means determines that the document management service is designated as the storage location of the document file, said second determination means determines that encryption according to the public key cryptosystem is not designated for the document file, and said third determination means determines that the document file is a file whose access rights are not managed by the security management server connected to the first network, said transmission means transmits the document file to the document management service, and
   when said first determination means determines that the document management service is designated as the storage location of the document file, said second determination means determines that encryption according to the public key cryptosystem is not designated for the document file, and said third determination means determines that the document file is a file whose access rights are managed by the security management server connected to the first network, said display displays the warning screen.

3. A computer-implemented method of controlling an information processing apparatus connected to a first network and which communicates with a document management service connected to a second network outside of the first network, the method comprising:
   a processor of the information processing apparatus executing:
   an acceptance step of accepting designation of a storage location of a document file;
   a transmission step of transmitting the document file to the storage location accepted in the acceptance step;
   a first determination step of determining whether the document management service connected to the second network outside of the first network is designated as the storage location of the document file;
   a second determination step of determining whether encryption according to a public key cryptosystem is designated for the document file; and
   a display step of, when the document management service is determined in the first determination step to be designated as the storage location of the document file and encryption according to the public key cryptosystem is determined in the second determination step to be designated for the document file, displaying on a display of the information processing apparatus a warning screen regarding storing the document file by the document management service, wherein the transmission step transmits the document file to the document management service in a case where a user confirms the transmission via the warning screen, and the transmission step does not transmit the document file to the document management service in a case where the user confirms not to transmit the document file via the warning screen.

4. The computer-implemented method according to claim 3, wherein the method further comprises a third determination step of determining whether the document file is a file whose access rights are managed by a security management server connected to the first network, and when said first determination step determines that the document management service is designated as the storage location of the document file, said second determination step determines that encryption according to the public key cryptosystem is not designated for the document file, and said third determination step determines that the document file is a file whose access rights are not managed by the security management server connected to the first network, said transmission step transmits the document file to the document management service, and when said first determination step determines that the document management service is designated as the storage location of the document file, said second determination step determines that encryption according to the public key cryptosystem is not designated for the document file, and said third determination step determines that the document file is a file whose access rights are managed by the security management server connected to the first network, said display step displays the warning screen.

5. A non-transitory computer-readable storage medium on which is stored computer-executable code of a program for controlling an information processing apparatus connected to a first network and which communicates with a document management service connected to a second network outside of the first network, the program comprising:

code for an acceptance step of accepting designation of a storage location of a document file;

code for a transmission step of transmitting the document file to the storage location accepted in the acceptance step;

code for a first determination step of determining whether the document management service connected to the second network outside of the first network is designated as the storage location of the document file;

code for a second determination step of determining whether encryption according to a public key cryptosystem is designated for the document file; and code for a displaying step of, when the document management service is determined in the first determination step to be designated as the storage location of the document file and encryption according to the public key cryptosystem is determined in the second determination step to be designated for the document file, displaying on a display of the information processing apparatus a warning screen regarding storing the document file by the document management service, wherein the transmission step transmits the document file to the document management service in a case where a user confirms the transmission via the warning screen, and the transmission step does not transmit the document file to the document management service in a case where the user confirms not to transmit the document file via the warning screen.

6. The non-transitory computer-readable storage medium according to claim 5, wherein the program further comprises code for a third determination step of determining whether the document file is a file whose access rights are managed by a security management server connected to the first network, and when said first determination step determines that the document management service is designated as the storage location of the document file, said second determination step determines that encryption according to the public key cryptosystem is not designated for the document file, and said third determination step determines that the document file is a file whose access rights are not managed by the security management server connected to the first network, said transmission step transmits the document file to the document management service, and when said first determination step determines that the document management service is designated as the storage location of the document file, said second determination step determines that encryption according to the public key cryptosystem is not designated for the document file, and said third determination step determines that the document file is a file whose access rights are managed by the security management server connected to the first network, said display step displays the warning screen.

* * * * *